(12) United States Patent
Yamauchi

(10) Patent No.: US 7,738,041 B2
(45) Date of Patent: Jun. 15, 2010

(54) VIDEO SIGNAL PROCESSOR AND VIDEO SIGNAL PROCESSING METHOD

(75) Inventor: Himio Yamauchi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/341,821

(22) Filed: Dec. 22, 2008

(65) Prior Publication Data

US 2009/0167939 A1 Jul. 2, 2009

(30) Foreign Application Priority Data

Dec. 26, 2007 (JP) ............................. 2007-334995

(51) Int. Cl.
 H04N 5/46 (2006.01)
 H04N 11/20 (2006.01)
(52) U.S. Cl. ..................... 348/558; 348/452; 348/449
(58) Field of Classification Search ............... 348/558, 348/441–459, 97, 700, 701
 See application file for complete search history.

(56) References Cited

U.S. PATENT DOCUMENTS

| | | | |
|---|---|---|---|
| 6,380,978 B1 * | 4/2002 | Adams et al. ............... | 348/452 |
| 6,799,622 B2 * | 10/2004 | Recchia, Jr. ................. | 156/515 |
| 7,158,186 B2 * | 1/2007 | Selby et al. ................. | 348/459 |
| 7,630,870 B2 * | 12/2009 | Chen et al. ...................... | 703/6 |
| 2005/0018087 A1 | 1/2005 | Lee | |
| 2008/0151103 A1 | 6/2008 | Asamura | |

FOREIGN PATENT DOCUMENTS

| | | |
|---|---|---|
| JP | 2002-290927 | 10/2002 |
| JP | 2004-297476 | 10/2004 |
| JP | 2005-45803 | 2/2005 |
| JP | 2007-129400 | 5/2007 |
| JP | 3916637 | 5/2007 |
| JP | 2007-274411 | 10/2007 |

* cited by examiner

*Primary Examiner*—M. Lee
(74) *Attorney, Agent, or Firm*—Blakely, Sokoloff, Taylor & Zafman LLP

(57) ABSTRACT

According to one embodiment, a video signal processor has a moving block determining module, a vertical edge detector, a moving block number counter, a moving field determining module, a pulldown pattern detector, and a pulldown signal determining module. The moving block determining module divides each field configuring an input video signal into a plurality of blocks, and determines a motion of a block within the plurality of blocks, the block of which the motion is determined having a same spatial position within two fields adjacent to each other. The vertical edge detector detects a vertical edge within each of the plurality of blocks in the each field. The moving block number counter counts a number of moving blocks excluding a block having the vertical edge within a screen based on the detection result of the vertical edge detector and the determination result of the moving block determining module. The moving field determining module determines a motion between the each field based on the counting result of the moving block number counter. The pulldown pattern detector detects a 2:2 pulldown pattern based on the determination result of the moving field determining module. The pulldown signal determining module determines whether the input video signal is a 2:2 pulldown signal depending on the detection result of the pulldown pattern detector.

12 Claims, 9 Drawing Sheets

VIDEO SIGNAL PROCESSOR AND VIDEO SIGNAL PROCESSING METHOD

CROSS-REFERENCE TO RELATED APPLICATIONS

This application is based upon and claims the benefit of priority from Japanese Patent Application No. 2007-334995, filed Dec. 26, 2007, the entire contents of which are incorporated herein by reference.

BACKGROUND

1. Field

One embodiment of the invention relates to a video signal processor detecting a pulldown signal of a movie or the like generated using a 2:2 pulldown, and a video signal processing method.

2. Description of the Related Art

Conventionally, an interlaced-to-progressive scanning converter generating an interpolation signal based on a detection result obtained by detecting an image movement in the video signal has been known for converting an interlaced scanning video signal into a progressive scanning video signal, in order to prevent an image quality deterioration in a moving image.

In the conventional interlaced-to-progressive scanning converter, it is concerned that an image quality of a moving image might be deteriorated during processing thereof. It has been known that the video signal of which frames or fields are generated in a constant pattern can be converted into a progressive scanning video signal without deteriorating the image quality. An interlaced scanning video signal generated using a 2:2 pulldown or 2:3 pulldown has a regularity such that two or three fields generated from a same frame are consecutive. Hence, if the pattern of the consecution is known, it is possible to use the sequential fields generated from the same frame for the conversion. Accordingly, the interlaced scanning signal can be converted into the progressive scanning signal by a field interpolation, regardless of whether the image being a still image or a moving image.

However, the conventional interlaced-to-progressive converter falsely determines an input video signal as a video signal using 2:2 pulldown (hereinafter, referred to as 2:2 pulldown signal) as in the following.

Suppose that a video contains an image having a steep (that is to say, a luminance difference being large) edge (an edge portion) along a horizontal direction of the image, and suppose that the image shifts to a vertical direction of the image at a constant speed (such image is called "an edge image moving at a constant speed" in the following). For example, such edge image moving at a constant speed corresponds to a rectangular image moving from down to up at a constant speed with even number pixels per field.

In such video signal, a difference between signal levels and the like of fields increases/decreases by every one field. Therefore, such video signal obtains the same pattern as that of the 2:2 pulldown signal when the difference is eliminated. Accordingly, when a video signal contains the edge image moving at a constant speed, such video signal is falsely determined as the 2:2 pulldown signal.

Conventionally, there has been known an interlaced-to-progressive scanning converter disclosed in, for example, Japanese Patent Application Publication (Kokai) No. 2004-297476, which avoids the aforementioned false determination.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

Figure 1:
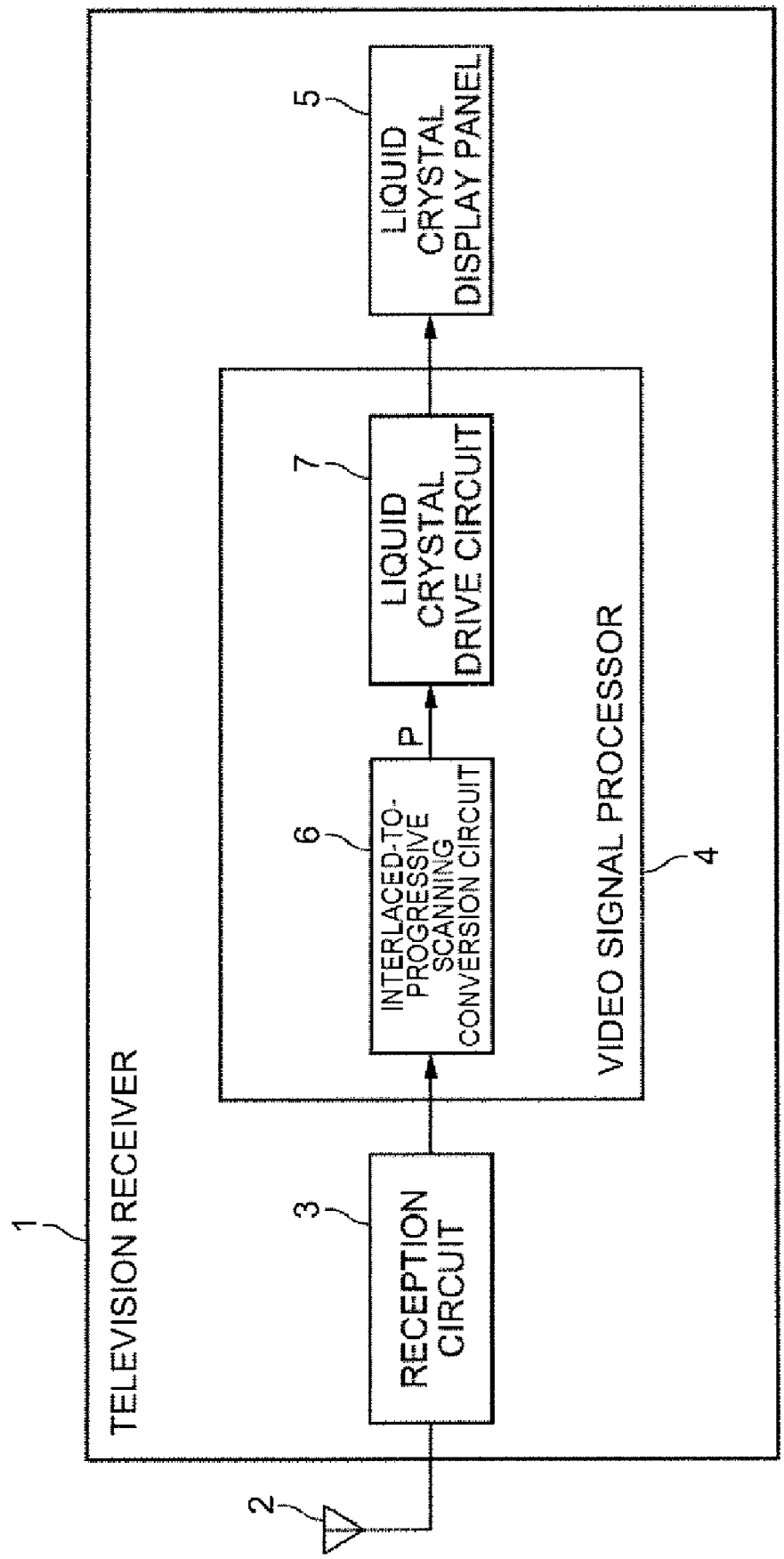
FIG. 1 is an exemplary block diagram of a television receiver having a video signal processor according to an embodiment of the invention.

Various embodiments according to the invention will be described hereinafter with reference to the accompanying drawings. In general, according to one embodiment of the invention, a video signal processor has a moving block determining module that divides each field configuring an input video signal into a plurality of blocks, and determines a motion of a block within the plurality of blocks between two fields adjacent to each other, the block of which the motion is determined having a same spatial position within the two fields adjacent to each other; a vertical edge detector that detects a vertical edge within each of the plurality of blocks in the each field; a moving block number counter that counts, among the blocks within a screen determined to have the motion by the moving block determining module, a number of blocks in which the vertical edge is not detected in the two fields, based on the detection result of the vertical edge detector and the determination result of the moving block determining module; a moving field determining module that determines a motion between the each field based on the counting result of the moving block number counter; a pulldown pattern detector that detects a 2:2 pulldown pattern based on the determination result of the moving field determining module; and a pulldown signal determining module that determines whether the input video signal is a 2:2 pulldown signal depending on the detection result of the pulldown pattern detector.

Further, according to another embodiment of the invention, a video signal processor has: a moving block determining module that divides each field configuring an input video signal into a plurality of blocks, and determines a motion of a block within the plurality of blocks between two fields adjacent to each other, the block of which the motion is determined having a same spatial position within the two fields adjacent to each other; a vertical edge detector that detects a vertical edge in each of the plurality of blocks in the each field; a first moving block number counter that counts, among the blocks within a screen determined to have the motion by the moving block determining module, a number of blocks in which the vertical edge is not detected in the two fields, based on the detection result of the vertical edge detector and the determination result of the moving block determining module; a second moving block number counter that counts a number of blocks within the screen determined to have the motion by the moving block determining module, based on the determination result of the moving block determining module; a first moving field determining module that determines a motion between the each field based on the counting result of the first moving block number counter; a second moving field determining module that determines a motion between the each field based on the counting result of the second moving block number counter; a first pulldown pattern detector that detects a 2:2 pulldown pattern based on the determination result of the first moving field determining module; a second pulldown pattern detector that detects a 2:2 pulldown pattern based on the determining result of the second moving field determining module; and a pulldown signal determining module that determines whether the input video signal is a 2:2 pulldown signal based on the detection result of the second pulldown pattern detector and the detection result of the first pulldown pattern detector.

Still further, according to another embodiment of the invention, a video signal processing method has: dividing each field configuring an input video signal into a plurality of blocks; determining a motion of a block within the plurality of blocks between two fields adjacent to each other, the block of which the motion is determined having a same spatial position within the two fields adjacent to each other; detecting a vertical edge within each of the plurality of blocks in the each field; counting, among the blocks within a screen determined to have the motion by the determining, a number of blocks in which the vertical edge is not detected in the two fields, based on the detection result of the detecting of the vertical edge and the determination result of the determining of the motion of the block; determining a motion between the each field based on the counting result of the counting; detecting a 2:2 pulldown pattern based on the determination result of the determining of the motion between the each field; and determining whether the input video signal is a 2:2 pulldown signal depending on the detection result of the detecting of the 2:2 pulldown pattern.

FIG. 1 is a block diagram of a configuration of a television receiver 1 including a video signal processor 4 according to an embodiment of the present invention. In the television receiver 1, a broadcast signal received by an antenna 2 is input to a reception circuit 3, and the reception circuit 3 selects a broadcast signal of a desired channel, and outputs a selected interlaced scanning video signal to the video signal processor 4.

In the video signal processor 4, the interlaced scanning video signal is converted into a video signal P (an interlaced-to-progressive scanning conversion signal described later) by an interlaced-to-progressive scanning conversion circuit 6. A liquid crystal drive circuit 7 operates as a display controller. The liquid crystal drive circuit 7 converts the interlaced-to-progressive scanning conversion signal P into a video signal capable of being displayed on a liquid crystal display panel 5, outputs the video signal, and makes the liquid crystal panel 5 to display the video. The liquid crystal display panel 5 displays the video using the video signal output from the video signal processor 4.

Figure 2:
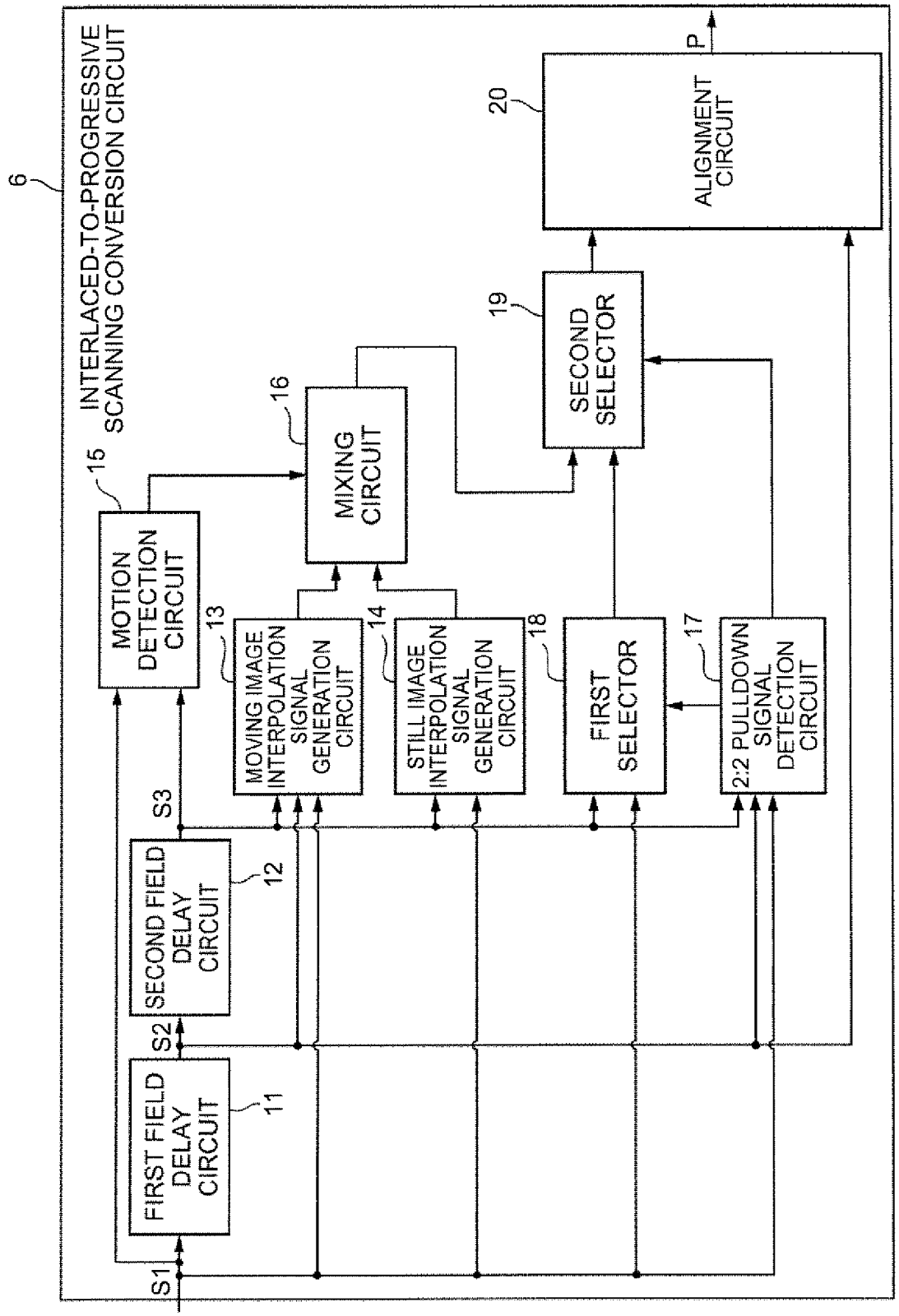
FIG. 2 is an exemplary block diagram of an interlaced-to-progressive scanning converter in the embodiment.

The interlaced-to-progressive scanning conversion circuit 6 has a configuration such as shown in FIG. 2. In the interlaced-to-progressive scanning conversion circuit 6, a current field signal S1 that is the input interlaced scanning video signal is supplied to a first field delay circuit 11 and read out from the first field delay circuit 11 as one-field delay signal S2 after one field.

The first field delay circuit 11 has, for example, two memory areas each of which being the size of one field, and an input video signal for one field is stored in the two memory areas alternately. Further, the stored video signal is read out alternately from the two memory areas.

Therefore, while the stored current field signal S1 is read out as the one-field delay signal S2 from the first field delay circuit 11, at the same time, a next current field signal S1 is stored in the first field delay circuit 11.

The one-field delay signal S2 read out from the first field delay circuit 11 is supplied to a second field delay circuit 12 and read out from the second field delay circuit 12 as a two-field delay signal S3 after one field. The configuration and operation of the second field delay circuit 12 are the same as that of the first field delay circuit 11.

A moving image interpolation signal generation circuit 13 performs a motion compensation process with application of a motion vector based on the current field signal S1, the one-field delay signal S2, and the two-field delay signal S3, so as to generate a moving image interpolation signal interpolated to the one-field delay signal S2.

A still image interpolation signal generation circuit 14 inputs the current field signal S1 and the two-field delay signal S3, and generates a still image interpolation signal using scan lines located respectively at the same position.

A motion detection circuit 15 obtains a difference value between the current field signal S1 and the two-field delay signal S3, detects a motion between frames based on the obtained difference value, and outputs a detection signal indicating the detection result to a mixing circuit 16.

The mixing circuit 16 mixes the moving image interpolation signal output from the moving image interpolation signal generation circuit 13 and the still image interpolation signal output from the still image interpolation signal generation circuit 14 at a mixture ratio corresponding to a motion detection signal, so as to generate a motion adapted interpolation signal.

A 2:2 pulldown signal detection circuit 17 determines whether the current field signal S1 is a 2:2 pulldown signal, and outputs a determination signal K (described in detail later) indicating the determination result. Further, the 2:2 pulldown signal detection circuit 17 generates a pair field selection signal based on the current field signal S1, the one-field delay signal S2, and the two-field delay signal S3.

The pair field selection signal is supplied to a first selector 18. The first selector 18 selects either one of the current field signal S1 and the two-field delay signal S3 as the field that is to be paired with the one-field delay signal S2 based on the pair field selection signal, and outputs the selected signal as a pair field signal to a second selector 19.

The second selector 19 selects the pair field signal when the determination signal K output from the 2:2 pulldown signal detection circuit 17 indicates that the current field signal 31 is the 2:2 pulldown signal, and on the other hand, when the determination signal K does not indicate that the current field signal S1 is the 2:2 pulldown signal, selects the motion adapted interpolation signal supplied from the mixing circuit 16. Then, the second selector 19 outputs the selected signal as an interpolation signal to an alignment circuit 20.

The alignment circuit 20 aligns (combines) the interpolation signal output from the second selector 19 and the one-field delay signal S2 that is a direct signal in a order of progressive scanning to generate the interlaced-to-progressive scanning conversion signal P.

Figure 3:
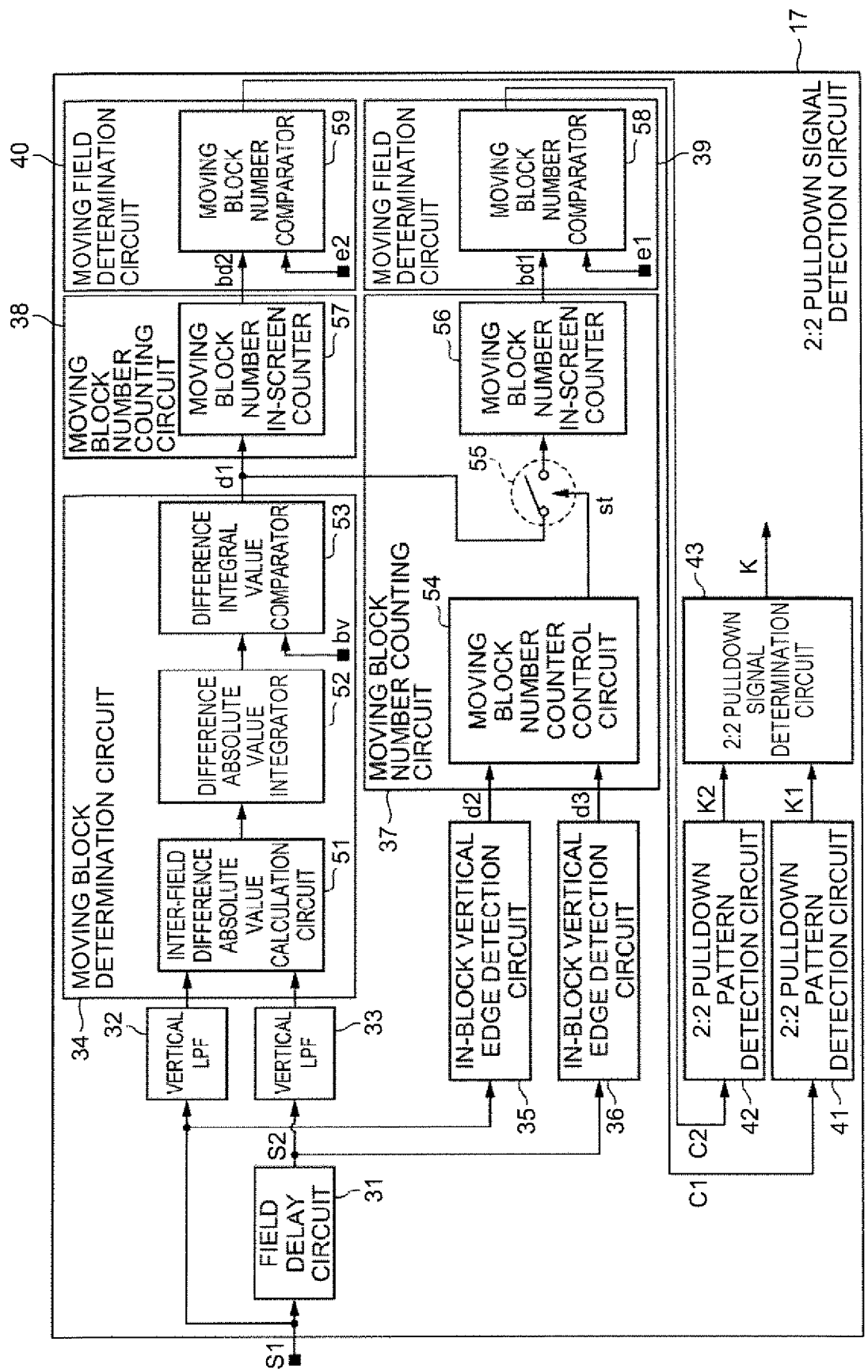
FIG. 3 is an exemplary block diagram of a 2:2 pulldown signal detection circuit in the embodiment.

The pulldown signal detection circuit 17 has a configuration shown in FIG. 3. The 2:2 pulldown signal detection circuit 17 has a field delay circuit 31, vertical LPFs 32 and 33, a moving block determination circuit 34, in-block vertical edge detection circuits 35 and 36, moving block number counting circuits 37 and 38, moving field determination circuits 39 and 40, 2:2 pulldown pattern detection circuits 41 and 42, and a 2:2 pulldown signal determination circuit 43.

The current field signal S1 is input to the in-block vertical edge detection circuit 35 in the 2:2 pulldown signal detection circuit 17. The current field signal S1 is input to the moving block determination circuit 34 after being input to the vertical LPF 32. The field delay circuit 31 delays the current field signal S1 for one field to become the one-field delay signal S2, and the one-field delay signal 52 is input to the in-block vertical edge detection circuit 36. The one-field delay signal S2 is input to the moving block determination circuit 34 after being input to the vertical LPF 33.

The moving block determination circuit 34 has an inter-field difference absolute value calculation circuit 51, a difference absolute value integrator 52, and a difference integral value comparator 53. The inter-field difference absolute value calculation circuit 51 divides each of adjacent two fields into plural blocks using the current field signal S1 and the one-field delay signal S2. Further, the difference absolute value calculation circuit 51 calculates a difference absolute value of a pixel with respect to a block within the plurality of blocks. Here, the block within the plurality of blocks is disposed at a spatially same position within two fields adjacent to each other. The difference absolute value integrator 52 integrates the calculated difference absolute value for every block. The difference integral value comparator 53 compares the integrated difference absolute value with a determination threshold value by used to determine whether each block is a moving video block (moving block). The moving block determination circuit 34 outputs a moving block signal d1 when each block is determined as the moving block. The moving block signal d1 is output to the moving block number counting circuits 37 and 38.

As will be described in detail later, the in-block vertical edge detection circuits 35 and 36 input the current field signal S1 and the one-field delay signal S2 respectively, and detects a vertical edge (the vertical edge will be described later) in a block of each respective field. The in-block vertical edge detection circuits 35 and 36 output edge detection signals d2 and d3 to the moving block number counting circuit 37 when the vertical edge is detected.

The moving block number counting circuit 37 that is a first moving block number counter counts the number of moving blocks within the screen based on the moving block signal d1 output from the moving block determination circuit 34 and the edge detection signals d2 and d3 output from the in-block vertical edge detection circuits 35 and 36. Here, the counted moving blocks excludes the vertical edge. The moving block number counting circuit 37 has a moving block number counter control circuit 54, a switch 55, and a moving block number in-screen counter 56.

The moving block number counter control circuit 54 outputs a stop signal st to the switch 55 when the vertical edge is detected in either one of the in-block vertical edge detection circuits 35 and 36 and when either one of the edge detection signals d2 and d3 is output. The switch 55 supplies the moving block signal d1 to the moving block number in-screen counter 56. However, when the stop signal st is output, the switch 55 stops supplying the moving block signal d1. The moving block number in-screen counter 56 counts the number of the moving blocks in the screen by adding up the moving block signal d1, and outputs a moving block number data bd1 to the moving field determination circuit 39. Accordingly, the moving block number in-screen counter 56 may count the number of the moving blocks only when the vertical edge is not detected.

The moving block number counting circuit 38 that is a second moving block number counter has a moving block number in-screen counter 57. The moving block number in-screen counter 57 counts the number of moving blocks in the screen by adding up the moving block signal d1, and outputs a moving block number data bd2 indicating the counting result to the moving field determination circuit 40. Since the moving block number counting circuit 38 does not have a moving block number counting control circuit or a switch such as the moving block number counting circuit 37, it counts the number of all moving blocks within the screen.

The moving field determination circuit 39 being a first moving field determining module has a moving block number comparator 58. The moving block number comparator 58 compares the moving block number data bd1 with a threshold value e1, and determines whether the field is a moving field or not according to the comparison result. The moving field determination circuit 39 outputs a determination result data C1 indicating the determination result to the 2:2 pulldown pattern detection circuit 41.

The moving field determination circuit 40 being a second moving field determining module has a moving block number comparator 59. The moving block number comparator 59 compares the moving block number data bd2 with a threshold value e2, and determines whether the field is a moving field or not according to the comparison result. The moving field determination circuit 40 outputs a determination result data C2 indicating the determination result to the 2:2 pulldown pattern detection circuit 42.

The moving field determination circuits 39 and 40 output respectively the determination result data C1 and C2 indicating "moving" when the field is determined to be the moving field, and output respectively the determination result data C1 and C2 indicating "still" when the field is not determined to be the moving field.

The 2:2 pulldown pattern detection circuits 41 and 42 detect the 2:2 pulldown pattern using the determination result data C1 and C2 output from the moving field determination circuits 39 and 40 respectively, and output detection signals K1 and K2 to the pulldown signal determination circuit 43. Here, the 2:2 pulldown pattern detection circuits 41 and 42 output detection signals K1 and K2 indicating that the pulldown is detected (the detection of the pulldown is to be described later) when each of the 2:2 pulldown pattern detection circuits 41 and 42 detects repeated pattern of "moving," "still," "moving," "still," and so on, for each field of each determination result data C1 and C2. On the other hand, the 2:2 pulldown pattern detection circuit 41 and 42 output detection signals K1 and K2 indicating that the pulldown is not detected when the 2:2 pulldown pattern detection circuits 41 and 42 does not detect the repeated pattern (the non-detection of the pulldown is to be described later).

The 2:2 pulldown signal determination circuit 43 determines whether the input video signal is the 2:2 pulldown signal based on the detection signals K1 and K2 (the determination hereinbefore is a pulldown determination which is to be described in detail later). The 2:2 pulldown signal determination circuit 43 outputs the determination signal K indicating the determination result of the pulldown determination.

An operation of the 2:2 pulldown signal detection circuit 17 having the configuration described as above is explained.

Suppose that a vertical edge is included in the input interlaced scanning video signal, and suppose that the vertical edge shifts to the vertical direction at a constant speed. Here, the vertical edge corresponds to a steep edge provided along a horizontal direction with a certain width. For example, suppose that the shifting of the vertical edge corresponds to a rectangular area BR indicating a box shaped object shown in FIG. 4 being shifted to the vertical direction (an arrow direction F in FIG. 4) at a constant speed (even number pixels/field). The rectangular area BR has a distinct contrast against the background and has a certain width, thereby the rectangular area BR has vertical edges B1 and B2.

When such rectangular area BR shifts in the vertical direction at a constant speed, a difference in the video signal between fields increases/decreases by every one field due to an interlaced structure. Therefore, the video signal including the rectangular area BR is falsely determined as the 2:2 pulldown signal.

Figure 4:
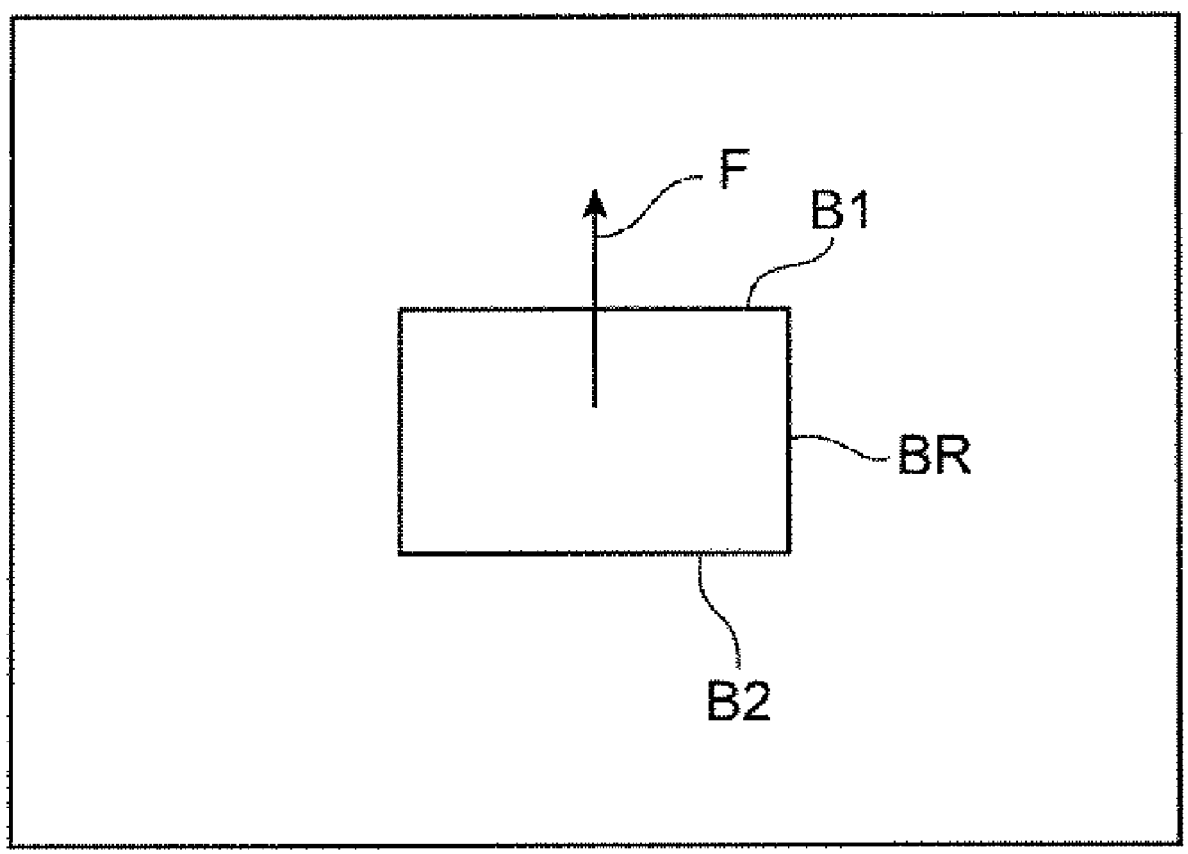
FIG. 4 is an exemplary schematic diagram of an edge image moving at a constant speed in the embodiment.
Figure 5:
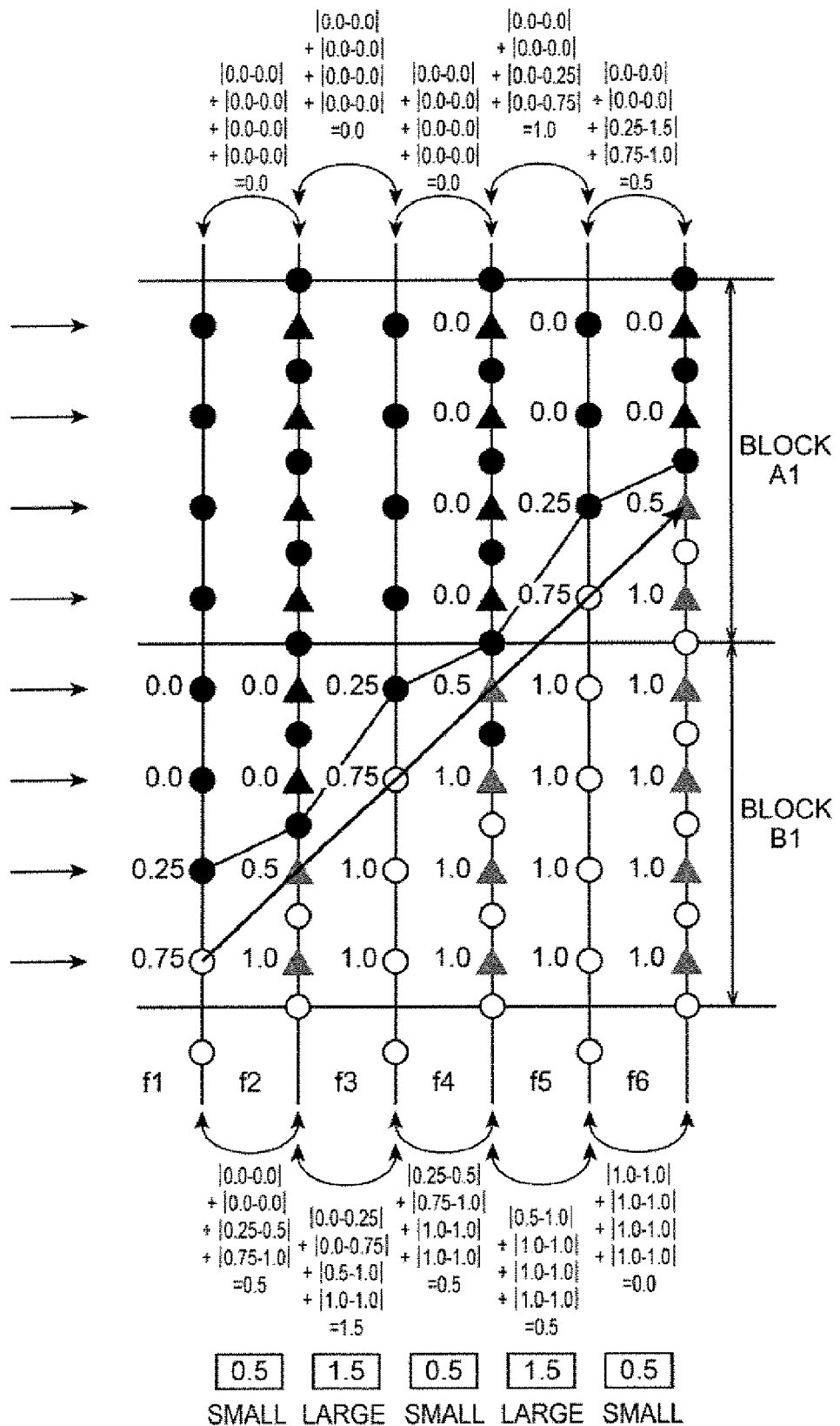
FIG. 5 is an exemplary schematic diagram of a rectangular area shown in FIG. 4 shifting vertically upward at speed of 2 pixels/field from field f1 to field f6 in the embodiment.

FIG. 5 shows the rectangular area BR shown in FIG. 4 shifting vertically upward at the speed of 2 pixels/field ranging from a field f1 to a field f6. Circle marks indicate pixels. Here, suppose that a signal level of the background is 0.0, and a signal level of the rectangular area BR is 1.0. Further, in order to filter out the difference in the video signal between fields, suppose that the vertical LPFs are applied to the pixels in each field so that the center of gravity of the pixel in each field is positioned at the vertical position shown in the arrow F. In FIG. 5, the vertical LPF of $(Z^{-1}+2+Z^{+1})/4$ is applied to the pixels in the fields f1, f3, f5, and the vertical LPF of $(1+Z^{+1})/2$ is applied to the pixels in the fields f2, f4, f6.

As described below, for example, there is a technique detecting the 2:2 pulldown pattern. Namely, at first, the screen is divided into plural blocks, and the difference value of the signal level between the fields is integrated for every block. Then, the number of the blocks having a large integrated difference value (a difference integral value) is counted for the whole screen, and determines a similarity between the two fields according to the counted value. The 2:2 pulldown pattern is detected depending on the determination result.

FIG. 5 shows the case that the 2:2 pulldown pattern is detected in the aforementioned manner. FIG. 5 shows what the difference integral values between the fields in a block A1 on an upper side and a block B1 on a lower side are, when the height of the block is 4 pixels. For simplification, the following explanation is given by using the difference integral values for only 4 pixels arranged in one row in the vertical direction. The difference integral values between the fields f1 and f2 are 0.0 in the block A and 0.5 in the block B1, therefore the total is 0.5. Also, the total of the difference integral values are 1.5 between the fields f2 and f3, 0.5 between the fields f3 and f4, 1.5 between the fields f4 and f5 and 0.5 between the fields f5 and f6. As can be seen, the difference integral value between the fields is repeated by a small value and large value in pattern for every one field. The pattern is the same as the case when the difference integral value of the 2:2 pulldown signal is integrated. Therefore, there is a possibility that the video signal including the edge image moving at a constant speed in the rectangular area BR shown in FIG. 4 is falsely determined as the 2:2 pulldown signal.

In the 2:2 pulldown signal detection circuit 17, on the other hand, even when the video signal includes the aforementioned edge image moving at a constant speed, the video signal is not falsely determined as the 2:2 pulldown signal.

As described before, the 2:2 pulldown signal detection circuit 17 has the moving block number counting circuit 37 as well as the moving block number counting circuit 38. A moving field determination is performed in the moving field determination circuit 39 and the moving field determination circuit 40 based on the respective counting results, and a pulldown pattern detection is performed in the 2:2 pulldown pattern detection circuit 41 and the 2:2 pulldown pattern detection circuit 42 according to the respective determination results.

An operation based on the number of all moving blocks in the screen is performed in the moving block number counting circuit 38, the moving field determination circuit 40, and the 2:2 pulldown pattern detection circuit 42. On the other hand, an operation based on the number of all moving blocks excluding blocks having the vertical edge is performed in the moving block number counting circuit 37, the moving field determination circuit 39, and the 2:2 pulldown pattern detection circuit 41.

Accordingly, in the 2:2 pulldown signal detection circuit 17, the difference in the number of the moving blocks due to the presence of the vertical edge can be reflected to the detection of the pulldown patterns.

Figure 6:
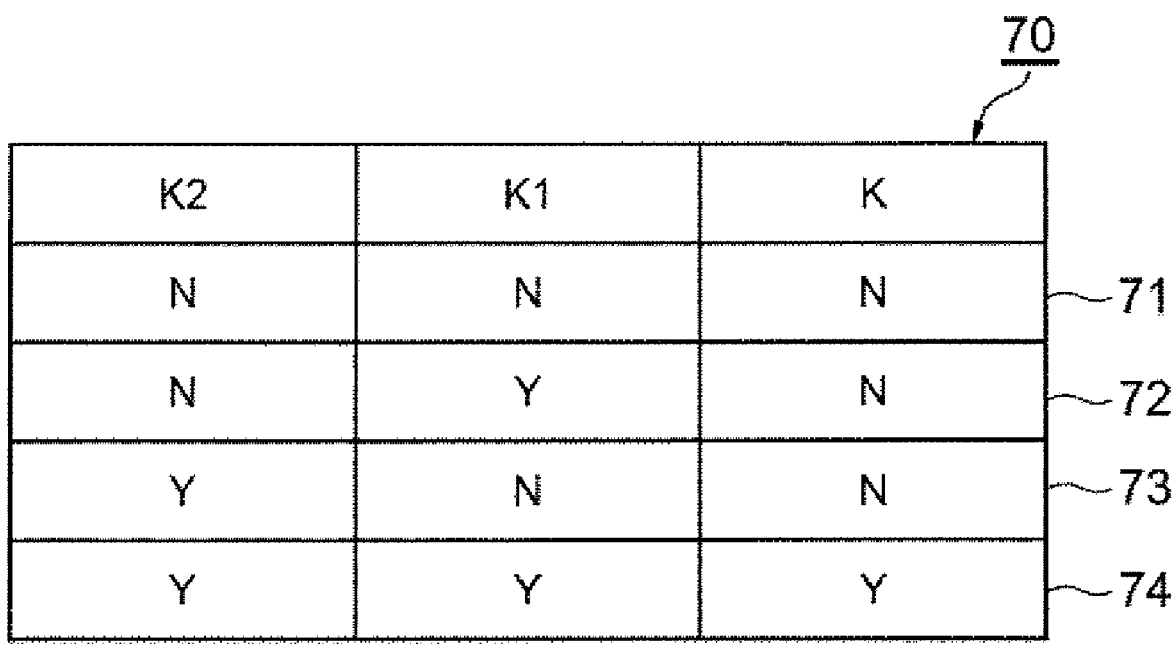
FIG. 6 is an exemplary determination table in the embodiment.

FIG. 6 is a chart showing a determination table 70. The determination table 70 shows a content of the pulldown determination performed in the 2:2 pulldown signal determination circuit 43, and the determination table 70 shows a relation between four determination patterns structured with the values of the detection signal K1 and the detection signal K2 and the determination signal K corresponding to the each determination pattern.

Since the detection signal K1 and the detection signal K2 indicate "Y" or "N," four patterns are available in total. For the detection signals K1 and K2, "Y" indicates that the pulldown pattern is detected for an arbitrary period (referred to as the pulldown detection). For the determination signal K, "Y" indicates the determination that the input video signal is the pulldown signal. For the detection signals K1 and K2, "N" indicates non-pulldown detection (the pulldown pattern can not be detected). For the determination signal K, "Y" indicates the determination that the input video signal is not the pulldown signal.

A determination pattern 71 is obtained when both of the detection signal K1 and K2 are "N," a determination pattern 72 is obtained when the detection signal K1 is "Y" and the detection signal K2 is "N". Further, a determination pattern 73 is obtained when the detection signal K1 is "N" and the detection signal K2 is "Y," and the determination pattern 74 is obtained when both of the detection signal K1 and K2 are "Y."

Since a conventional pulldown signal detection circuit does not have a configuration corresponding to the in-block vertical edge detection circuits 35 and 36, the moving block number counting circuit 37, the moving field determination circuit 39, and the 2:2 pulldown pattern detection circuit 41, the determination signal K is generated based only on the detection signal K2. Therefore, if the determination signal K2 is "Y," the resultant determination signal K becomes "Y" as well.

On the other hand, the in-block vertical edge detection circuits 35 and 36, the moving block number counting circuit 37, the moving field determination circuit 39, and the 2:2 pulldown pattern detection circuit 41 are provided in the 2:2 pulldown signal detection circuit 17 to perform the following pulldown determination based the detection signal K2 and the detection signal K1.

The 2:2 pulldown signal determination circuit 43 gives priority to the detection signal K2 when the detection signal K2 is "N," and outputs the determination signal K as "N" even when the detection signal K1 is "Y," as shown by The determination patterns 71 and 72.

The 2:2 pulldown signal determination circuit 43 gives priority to the detection signal K1 over the detection signal K2 when the detection signal K2 is "Y," and outputs the determination signal K in accordance with the detection signal K1. Namely, although the detection signal K2 is "Y," the determination signal K is to be "N" when the detection signal K1 is "N," as shown by the determination pattern 73.

In the case of the detection signal K2 being "Y," when the detection signal K1 is "Y," namely, only when both detection signals K1 and K2 are "Y," the determination signal K becomes "Y," as shown by the determination pattern 74.

Regarding the former determination pattern 73, if it is attempted to obtain the determination signal K only from the detection signal K2, the determination signal K is forced to be "Y" when the pulldown signal is detected by all the moving block determination including the vertical edge. However, the result differ from the result of the moving block determination that excludes the vertical edge (namely, the detection signal K). On the other hand, the 2:2 pulldown signal detection circuit 17 makes the determination signal K in the aforementioned case to be "N" so as to coincide with the result of the moving block determination excluding the vertical edge.

In this manner, even when it is determined that the pulldown is detected based on all the moving blocks, the 2:2 pulldown signal determination circuit 43 determines that the input video signal is not the pulldown signal when it is determined that the pulldown is not detected based on all the blocks that excludes the vertical edge. Consequently, it becomes possible to prevent falsely determining the video signal including the edge image moving at a constant speed as the 2:2 pulldown signal.

Accordingly, since the accuracy that the 2:2 pulldown signal is detected in the 2:2 pulldown signal detection circuit 17 is increased, the interlaced-to-progressive scanning conversion circuit 6 can output the highly accurate interlaced-to-progressive scanning conversion signal P. Further, the television receiver 1 can display a clear video of which its image quality is good.

That is to say, the 2:2 pulldown signal determination circuit 43 can determine that the input video signal is the pulldown signal only when the detection result based on all the moving blocks within the screen and the detection result based on the moving blocks that excludes the vertical edge both indicate that the pulldown is detected. Namely, the 2:2 pulldown signal determination circuit 43 determines that the input video signal is the pulldown signal only in the determination pattern 74. Consequently, it becomes possible to prevent falsely determining the video signal including the edge image moving at a constant speed as the 2.2 pulldown signal.

Since the 2:2 pulldown signal detection circuit 17 as described above is not required to detect the motion vector like the conventional technique, it is not necessary to provide a memory to detect the motion vector. Accordingly, increase in the circuit size can be prevented.

Figure 7:
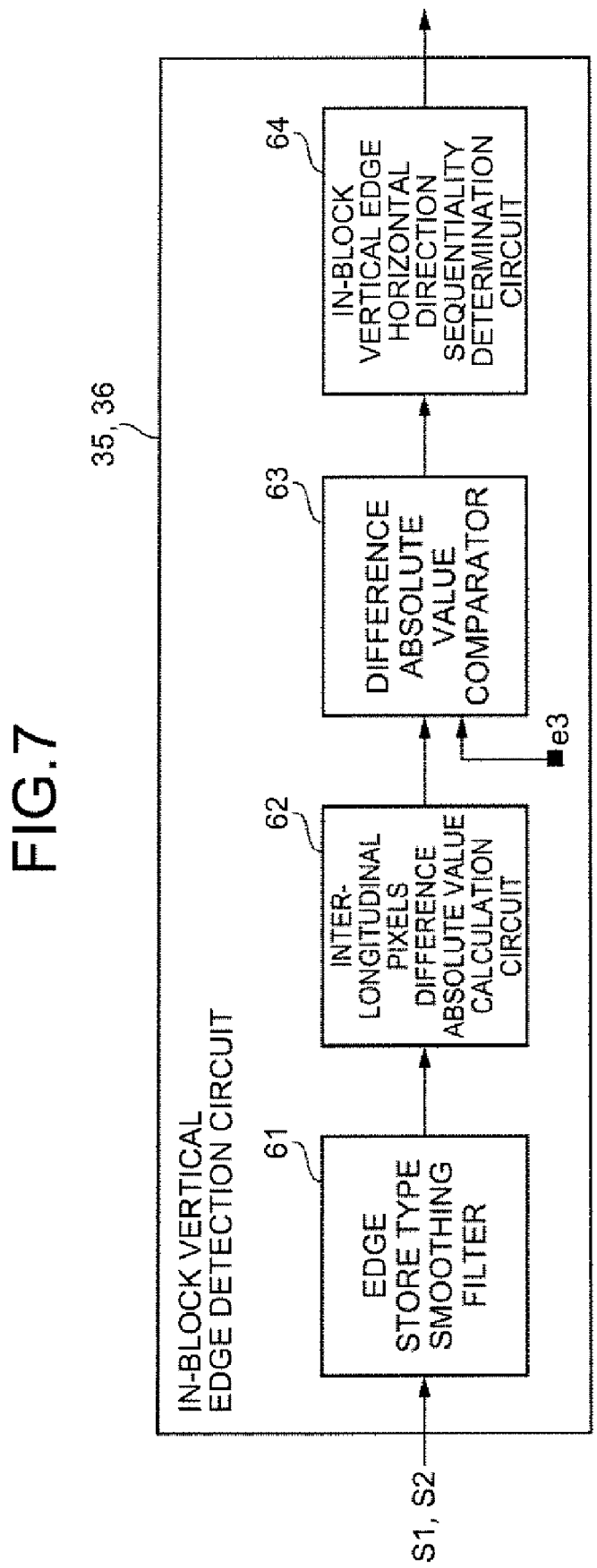
FIG. 7 is an exemplary block diagram of an in-block vertical edge detection circuit in the embodiment.

FIG. 7 is a diagram showing one example of a configuration of the in-block vertical edge detection circuits 35 and 36. Both of the in-block vertical edge detection circuits 35 and 36 have an edge store type smoothing filter 61, an inter-longitudinal pixels difference absolute value calculation circuit 62, a difference absolute value comparator 63, and an in-block vertical edge horizontal direction sequentiality determination circuit 64.

Figure 8:
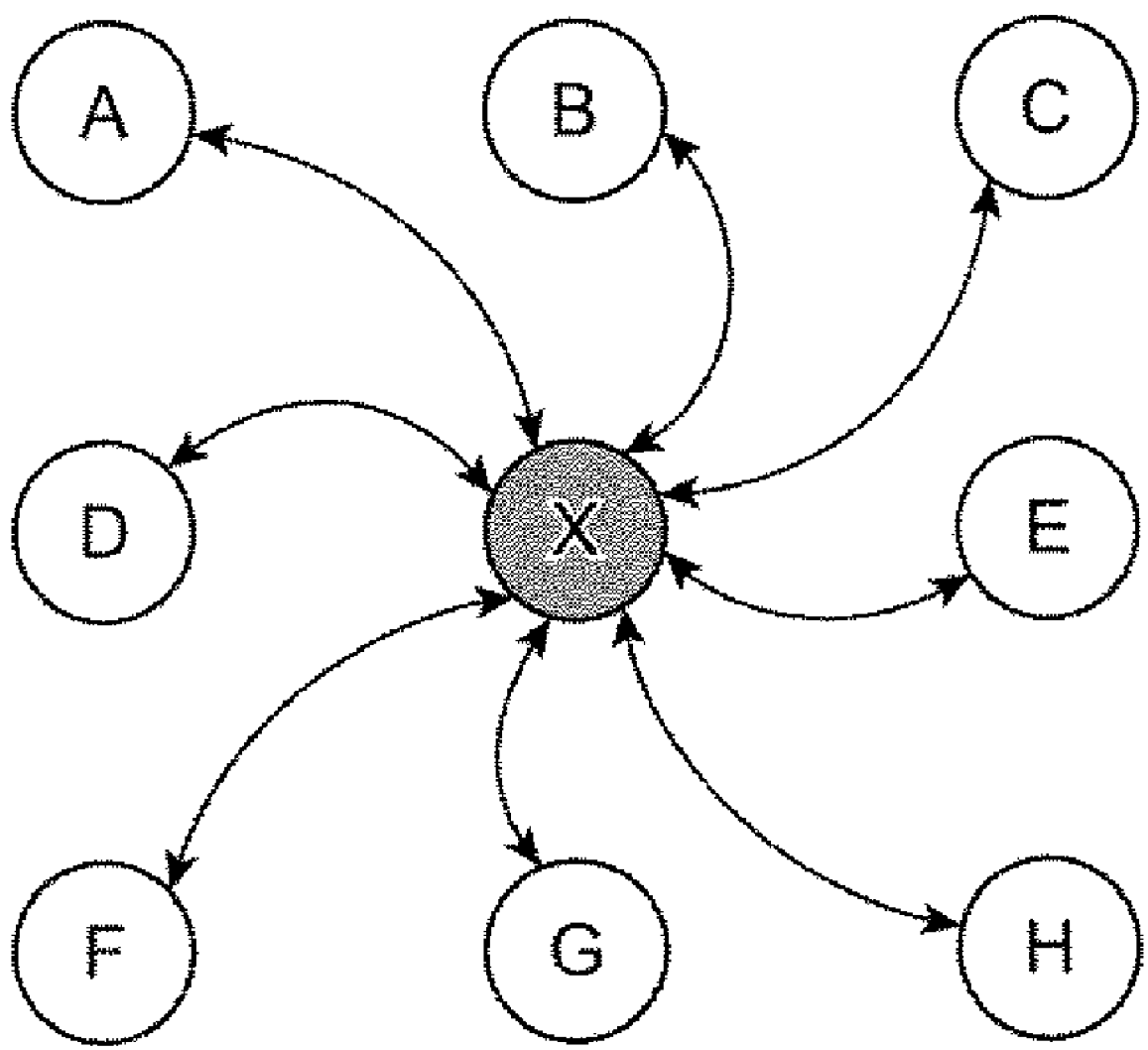
FIG. 8 is an exemplary schematic diagram of a structure of an edge store type smoothing filter in the embodiment.

As shown in FIG. 8, the edge store type smoothing filter 61 outputs an average value of peripheral pixels of which the difference between each of the peripheral pixels A, B, C, D, F, F, G, and H disposed around a pixel X and the pixel X is equal to or lower than the threshold value. Further, the edge store type smoothing filter 61 outputs an average value of pixel X (ϵ filter). The inter-longitudinal pixels difference absolute value calculation circuit 62 calculates the absolute value of the difference between the pixels positioned longitudinally. The difference absolute value comparator 63 compares the difference absolute value with the threshold value (an edge determination threshold value) e3 that is used to determine the presence of the vertical edge, and outputs the comparison result to the in-block vertical edge horizontal direction sequentiality determination circuit 64. The in-block vertical edge horizontal direction sequentiality determination circuit 64 determines sequentiality in a horizontal direction of the vertical edge in the block. In particular, the in-block vertical edge horizontal direction sequentiality determination circuit 64 determines that the vertical edge is present when a range which surpasses the edge determination threshold value is sequential in the horizontal direction over the determined range, and outputs the edge signals d2 and d3.

Figure 9A:
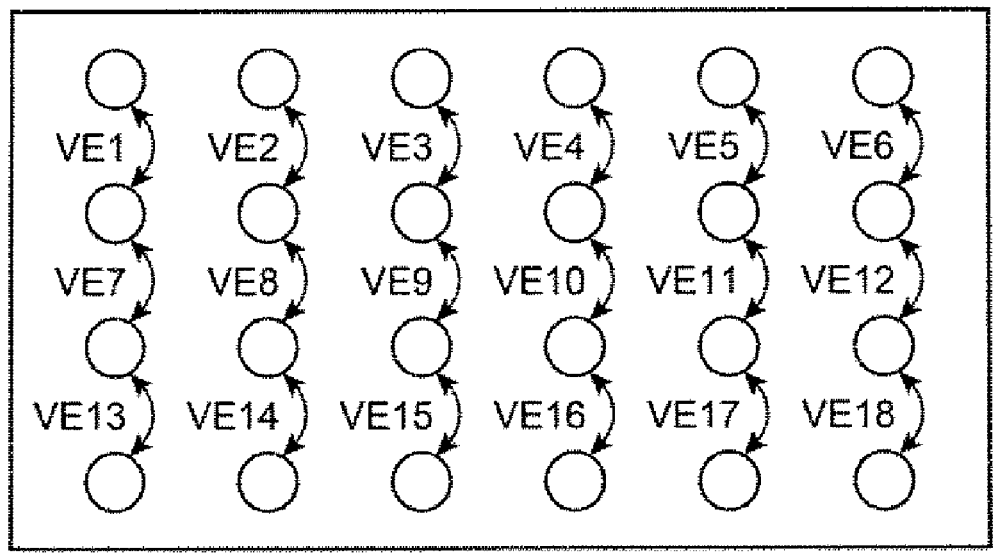
FIG. 9A is an exemplary schematic diagram of vertical edge candidate pixels in blocks in field f1 shown in FIG. 5.
Figure 9B:
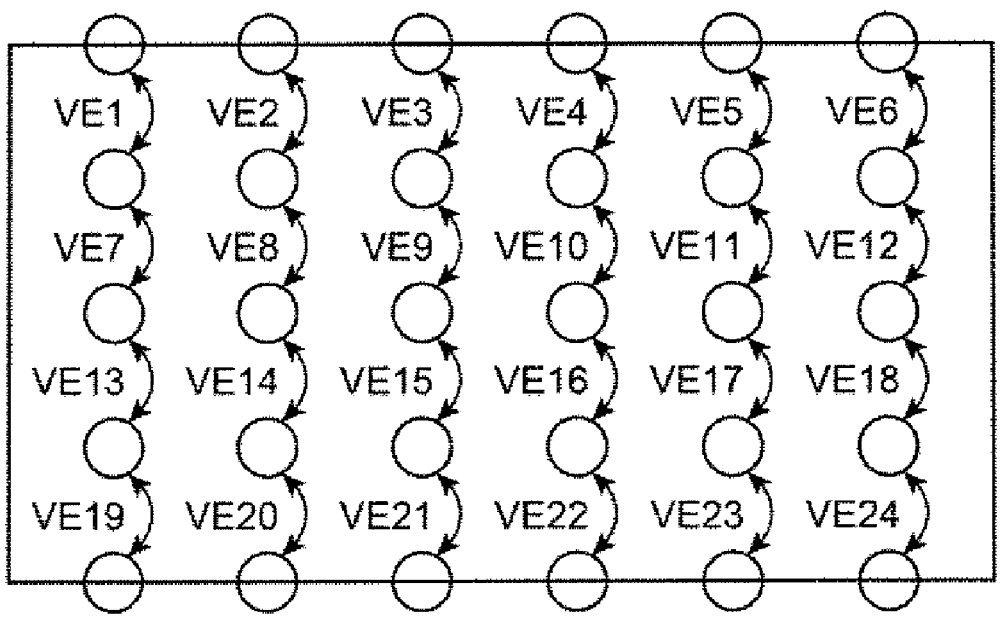
FIG. 9B is an exemplary schematic diagram of vertical edge candidate pixels in blocks in field f2 shown in FIG. 5.

FIGS. 9A and 9B show vertical edge candidate pixels in the blocks in the field f1 in FIG. 5 as from VE1 to VE18, and show vertical edge candidate pixels in the field f2 as from VE1 to VE24. The example shows the block size as 6 horizontal pixels×4 vertical pixels.

The in-block vertical edge horizontal direction sequentiality determination circuit 64 determines that there is the horizontal sequence of the vertical edge when the vertical edges which are equal to or more than an arbitrary number exist sequentially in any one of the ranges from the VET to the VE6, from the VE7 to the VE12 and from the VE13 to the VE18, for example, in the case of the blocks in the field f1. Similarly, the in-block vertical edge horizontal direction sequentiality determination circuit 64 determines that there is the horizontal sequence of the vertical edge when the vertical edges which are equal to or more than the arbitrary number exist sequentially in any one of the ranges from the VE1 to the VE6, from the VE7 to the VE12, from the VE13 to the VE18 and from the VE19 to the VE24, for example, in the case of blocks in the field f2.

It becomes possible to detect the vertical edge by providing the in-block vertical edge detection circuits 35 and 36 mentioned above.

As described above, although the steep horizontally-shaped edge is included in the video signal and shifts in the vertical direction at a constant speed, increase/decrease of the number of the moving blocks every one field is not influenced in the 2:2 pulldown signal detection circuit 17. Therefore, the 2:2 pulldown signal detection circuit 17 can prevent the false pulldown determination, and possible to output highly accurate interlaced-to-progressive scanning conversion signal P. It also can suppress the increase in the circuit size since the detection of the motion vector is unnecessary.

The above explanation is for the embodiment of the present invention and is not to limit the apparatus and method according to the present invention, and various modification examples can be simply implemented. Further, any apparatus or method configured by appropriately combining components, functions, characteristics or method steps in each embodiment is included in the present invention.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A video signal processor comprising:
a moving block determining module that divide each field configuring an input video signal into a plurality of blocks, and determine a motion of a block within the plurality of blocks between two fields adjacent to each other, the block of which the motion is determined having a same spatial position within the two fields adjacent to each other;
a vertical edge detector that detects a vertical edge within each of the plurality of blocks in the each field;
a moving block number counter that counts, among the blocks within a screen determined to have the motion by the moving block determining module, a number of blocks in which the vertical edge is not detected in the two fields, based on the detection result of the vertical edge detector and the determination result of the moving block determining module;
a moving field determining module that determines a motion between the each field based on the counting result of the moving block number counter;
a pulldown pattern detector that detects a 2:2 pulldown pattern based on the determination result of the moving field determining module; and
a pulldown signal determining module that determines whether the input video signal is a 2:2 pulldown signal depending on the detection result of the pulldown pattern detector.

2. A video signal processor comprising:
a moving block determining module that divides each field configuring an input video signal into a plurality of blocks, and determines a motion of a block within the plurality of blocks between two fields adjacent to each other, the block of which the motion is determined having a same spatial position within the two fields adjacent to each other;
a vertical edge detector that detects a vertical edge within each of the plurality of blocks in the each field;
a first moving block number counter that counts, among the blocks within a screen determined to have the motion by the moving block determining module, a number of blocks in which the vertical edge is not detected in the two fields, based on the detection result of the vertical edge detector and the determination result of the moving block determining module;
a second moving block number counter that counts a number of all blocks within the screen determined to have the motion by the moving block determining module, based on the determination result of the moving block determining module;
a first moving field determining module that determines a motion between the each field based on the counting result of the first moving block number counter;
a second moving field determining module that determines a motion between the each field based on the counting result of the second moving block number counter;
a first pulldown pattern detector that detects a 2:2 pulldown pattern based on the detection result of the first moving field determining module;
a second pulldown pattern detector that detects a 2:2 pulldown pattern based on the determining result of the second moving field determining module; and
a pulldown signal determining module that determines whether the input video signal is a 2:2 pulldown signal based on the detection result of the first pulldown pattern detector and the detection result of the second pulldown pattern detector.

3. The video signal processor according to claim 1, wherein the pulldown signal determining module determines that the input video signal is not the 2:2 pulldown signal when the detection result of the pulldown pattern detector indicates non-detection of the 2:2 pulldown pattern.

4. The video signal processor according to claim 2, wherein the pulldown signal determining module determines that the input video signal is not the 2:2 pulldown signal, when the detection result of the first pulldown pattern detector indicates non-detection of the 2:2 pulldown pattern in spite of the detection result of the second pulldown pattern detector.

5. The video signal processor according to claim 2, wherein the pulldown signal determining module determines that the input video signal is the 2:2 pulldown signal when the detection result of the first pulldown pattern detector and the detection result of the second pulldown pattern detector both indicate detection of the 2:2 pulldown pattern.

6. The video signal processor according to claim 1, wherein the vertical edge detector determines that the vertical edge is present when the edges having a difference absolute value between longitudinally positioned pixels that exceeds an edge determination threshold value used to detect the vertical edge is sequential over a determined range, so as to detect the vertical edge.

7. The video signal processor according to claim 2, wherein the vertical edge detector determines that the vertical edge is present when the edges having a difference absolute value between longitudinally positioned pixels that exceeds an edge determination threshold value used to detect the vertical edge is sequential over a determined range, so as to detect the vertical edge.

8. The video signal processor according to claim 1, further comprising:
an interlaced-to-progressive scanning conversion signal output module that outputs an interlaced-to-progressive scanning conversion signal using an interpolation signal corresponding to the determination result of the pulldown signal determining module.

9. The video signal processor according to claim 2, further comprising:
an interlaced-to-progressive scanning conversion signal output module that outputs an interlaced-to-progressive scanning conversion signal using an interpolation signal corresponding to the determination result of the pulldown signal determining module.

10. The video signal processor according to claim 8, further comprising:
a display controller that displays a video on a video display apparatus using the interlaced-to-progressive scanning conversion signal output from the interlaced-to-progressive scanning conversion signal output module.

11. The video signal processor according to claim 9, further comprising:
a display controller that displays a video on a video display apparatus using the interlaced-to-progressive scanning conversion signal output from the interlaced-to-progressive scanning conversion signal output module.

12. A video signal processing method comprising:
dividing each field configuring an input video signal into a plurality of blocks;
determining a motion of a block within the plurality of blocks between two fields adjacent to each other, the block of which the motion is determined having a same spatial position within the two fields adjacent to each other;
detecting a vertical edge within each of the plurality of blocks in the each field;
counting, among the blocks within a screen determined to have the motion by the determining, a number of blocks in which the vertical edge is not detected in the two fields, based on the determination result of the determining of the motion of the block and the detection result of the detecting of the vertical edge;
determining a motion between the each field based on the counting result of the counting;
detecting a 2:2 pulldown pattern based on the determination result of the determining of the motion between the each field; and
determining whether the input video signal is a 2:2 pulldown signal depending on the detection result of the detecting of the 2:2 pulldown pattern.

* * * * *